(12) United States Patent
Okamoto et al.

(10) Patent No.: US 7,858,002 B2
(45) Date of Patent: Dec. 28, 2010

(54) METHOD FOR INJECTION EXPANSION MOLDING OF THERMOPLASTIC RESIN

(75) Inventors: Akio Okamoto, Sanyouonoda (JP); Kazuaki Miyamoto, Ube (JP)

(73) Assignee: Ube Machinery Corporation, Ltd., Ube-shi (JP)

( * ) Notice: Subject to any disclaimer, the term of this patent is extended or adjusted under 35 U.S.C. 154(b) by 542 days.

(21) Appl. No.: 11/579,414

(22) PCT Filed: Jul. 21, 2005

(86) PCT No.: PCT/JP2005/013415
§ 371 (c)(1),
(2), (4) Date: Nov. 2, 2006

(87) PCT Pub. No.: WO2006/011415
PCT Pub. Date: Feb. 2, 2006

(65) Prior Publication Data
US 2008/0290543 A1    Nov. 27, 2008

(30) Foreign Application Priority Data
Jul. 26, 2004    (JP)  ............................. 2004-217333

(51) Int. Cl.
*B29C 45/00* (2006.01)
*B29C 45/70* (2006.01)
(52) U.S. Cl. .............. 264/55; 264/50; 264/56; 264/328.7; 264/45.1; 264/45.3
(58) Field of Classification Search ............. 264/36.11, 264/41, 42, 45.1, 45.3, 45.7, 45.8, 45.9, 317, 264/318, 319, 328.7
See application file for complete search history.

(56) References Cited

U.S. PATENT DOCUMENTS

| | | | | | |
|---|---|---|---|---|---|
| 4,144,297 | A | * | 3/1979 | Tomar | 264/45.5 |
| 4,596,832 | A | * | 6/1986 | Ariga et al. | 521/58 |
| 4,889,669 | A | * | 12/1989 | Suzuki | 264/45.9 |
| 5,034,171 | A | * | 7/1991 | Kiczek et al. | 264/51 |
| 5,823,889 | A | * | 10/1998 | Aoyama | 473/374 |

(Continued)

FOREIGN PATENT DOCUMENTS

EP        1166991 A2 *  1/2002

(Continued)

*Primary Examiner*—Khanh Nguyen
*Assistant Examiner*—Keith T Aziz
(74) *Attorney, Agent, or Firm*—Edwards Angell Palmer & Dodge LLP

(57) ABSTRACT

An injection-foaming method for a thermoplastic resin comprising using an injection unit 30 provided with a hopper 35, a plasticizing cylinder 31 and a screw 32, and a mold 10 having a mold cavity 10a of changeable capacity; filling the mold cavity 10a with a foaming-agent-containing melted resin injected from the injection unit 30; and then enlarging the mold cavity 10a for allowing the foaming-agent-containing melted resin to expand, wherein inclusion of a foaming agent into a thermoplastic resin is done by using a mixture of a foam nucleating agent and a foaming gas as foaming agent, feeding the mixture to hopper 35 or plasticizing cylinder 31 and screw 32 of injection unit 30 at a pressure of 0.1 MPa or more and less than 1.0 MPa, and contacting the mixture with a pre- or post-plasticized thermoplastic resin present in hopper 35 or plasticizing cylinder 31 and screw 32.

10 Claims, 2 Drawing Sheets

U.S. PATENT DOCUMENTS

| | | | |
|---|---|---|---|
| 6,849,667 B2 * | 2/2005 | Haseyama et al. | 521/170 |
| 7,138,175 B2 * | 11/2006 | Saito | 428/304.4 |
| 7,166,247 B2 * | 1/2007 | Kramer | 264/50 |
| 2002/0153623 A1 * | 10/2002 | Gobron et al. | 264/1.1 |
| 2004/0097678 A1 * | 5/2004 | Tsuji et al. | 526/288 |
| 2006/0273482 A1 * | 12/2006 | Kobayashi et al. | 264/41 |

FOREIGN PATENT DOCUMENTS

| | | |
|---|---|---|
| JP | S43-9913 | 4/1968 |
| JP | S44-6080 | 3/1969 |
| JP | 06-506724 | 7/1994 |
| JP | 2002-79545 | 3/2002 |
| JP | 2002-200640 | 7/2002 |
| JP | 2003-119311 | 4/2003 |
| JP | 2003-211480 | 7/2003 |

* cited by examiner

METHOD FOR INJECTION EXPANSION MOLDING OF THERMOPLASTIC RESIN

TECHNICAL FIELD

The present invention relates to injection-foaming methods of thermoplastic resins. More specifically, the present invention relates to injection-foaming methods of thermoplastic resins which can simply, safely, and efficiently produce foam injection molded products having predetermined cell diameters and densities.

BACKGROUND ART

Foamed products having a large number of cells formed in resins are superior in terms of properties such as lightness in weight, heat insulation, sound absorption, and stiffness at the same mass, and therefore, are used in various fields. Recently, weight reduction has particularly been regarded as being of importance because weight reduction is directly related to cost reduction in raw materials and transportation. Consequently, the number of fields to which foamed products have been applied has been further increased. Foam molding methods for resins are classified into physical foaming and chemical foaming methods according to the types of foaming agents mixed with the resins. The physical foaming methods use a physical foaming agent; an inert gas such as nitrogen and carbon dioxide, or a volatile substance such as a hydrocarbon and a fluorocarbon. The chemical foaming methods use a chemical foaming agent; an organic foaming agent such as an azo compound and a nitroso compound, or an inorganic foaming agent such as sodium bicarbonate. In injection-foaming methods using these foaming methods for the molding of resins in the injection molding methods, foamed products including cells having a cell diameter of about 80 to 300 μm in the molded products can be produced by filling a mold cavity, by injection, with a foaming-agent-containing melted resin prepared by mixing a foaming agent and a resin, and expanding the resin.

As an example of a foam-molding method for a resin, a molding method is known for producing a foamed product including cells in the molded product by mixing a chemical foaming agent or a physical foaming agent with an olefin-based resin, melting the resulting mixture, and expanding the resin by a short shot method (low-pressure molding) (see Patent Document 1). In the method disclosed in Patent Document 1, a molding machine composed of an extruder, an accumulator, and a mold is used. A foam injection molded product including cells is produced by preparing a foaming-agent-containing melted resin by mixing a resin and a chemical foaming agent or a physical foaming agent, e.g., an inert gas such as nitrogen or a volatile substance such as a hydrocarbon or a fluorocarbon, feeding the foaming-agent-containing melted resin into the accumulator with the extruder, injecting the foaming-agent-containing melted resin fed into the accumulator into the mold, and allowing the resin to expand.

In addition, as an example of a method for producing a foamed product by using a physical foaming agent, there is disclosed a method that is performed by feeding a gas such as air or a volatile substance from an extruder hopper under increased pressure together with the feeding of a resin, and conducting the melting of the resin, and allowing the resin to contain bubbles and dispersing bubbles by using the screw extruder (see Patent Document 2). In the method disclosed in Patent Document 2, an extrusion product of a sponge-like material including closed cells is produced by using a polyethylene and supplying air under an increased pressure of about 0.69 to 0.78 MPa (7 to 8 kgf/cm$^2$). As an example of a method for producing a foamed product using carbon dioxide, which is an inert gas, as a foaming gas in its supercritical state, there is disclosed a method for markedly increasing the cell density (the number of cells per unit) compared with that in a foamed product formed by using a known chemical foaming agent or physical foaming agent (see Patent Document 3). In the method disclosed in Patent Document 3, a molded resin product including ultrafine pores having a size of less than 1 μm, which are called as microcells, in the molded product is produced by mounting a molding machine with a system composed of a supercritical-fluid booster, a supercritical-fluid feeder, and a gas cylinder; injecting carbon dioxide in a supercritical state into a melted resin from a plasticizing cylinder of this molding machine for dissolving carbon dioxide in the melted resin; filling a mold with the melted resin containing the injected carbon dioxide by injection; and expanding the resin.

Patent Document 1: JP-B-44-6080
Patent Document 2: JP-B-43-9913
Patent Document 3: JP-K-06-506724

However, the above-mentioned methods disclosed in Patent Documents 1 to 3 have the following problems. That is, in the method disclosed in Patent Document 1, when a resin and an organic chemical foaming agent such as an azo compound or a nitroso compound are fed for molding, corrosive decomposition products such as ammonia, carbon monoxide, steam vapor, cyanic acid, and isocyanic acid are generated by heat decomposition. Problematically, these decomposition products are discharged to the atmosphere and also remain in the molded product. When a physical foaming agent that is free from the generation of decomposition products, i.e., a volatile substance such as a hydrocarbon or a fluorocarbon is fed for the molding, the exhaust of the gas to the atmosphere is regulated as a material which causes pollution and destruction of the environment. Thus, the use of such a gas is problematic. In the method disclosed in Patent Document 2, the gas cannot be finely dispersed in the foaming-agent-containing melted resin. Therefore, it is difficult to produce a foamed product having a predetermined cell density and cell diameter; which is problematic. Furthermore, in case of the method disclosed in Patent Document 3, since the installation of a supercritical-fluid generator and feeder are indispensable, these apparatuses utilize a high-pressure gas and therefore are under legal restrictions, and thus, there are problems that the introduction of facilities and the handling of them become troublesome.

The present invention has been accomplished in view of the above-mentioned problems of the known technologies and aims to provide an injection-foaming method for a thermoplastic resin which can simply, safely, and efficiently produce a foamed product having a predetermined cell diameter and density. Furthermore, the present invention also aims to provide an injection-foaming method for a thermoplastic resin which is environmentally friendly.

DISCLOSURE OF INVENTION

The present invention has been accomplished to achieve the above-mentioned objects and provides an injection-foaming method for a thermoplastic resin described below.

[1] An injection-foaming method for a thermoplastic resin which comprises using a molding machine provided with an injection unit having a feeding part and a plasticizing part wherein a thermoplastic resin fed from the feeding part is plasticized and the resultant resin is injected as a foaming-agent-containing melted resin containing a foaming agent and a mold being provided with a mold cavity capable of expanding and contracting and being filled with the foaming-agent-containing melted resin injected from the injection unit, filling the mold cavity with a foaming-agent-containing melted resin by injecting it from the injection unit, and then enlarging of the mold cavity for allowing the foaming-agent-containing melted resin to expand, the method is characterized in that an inclusion of a foaming agent into a thermoplastic resin is carried out by using a mixture of a foam nucleating agent and a foaming gas as a foaming agent, the mixture is fed to a feeding part or a plasticizing part of an injection unit at a pressure of 0.1 MPa or more and less than 1.0 MPa, and the mixture is brought into contact with a thermoplastic resin before or after the plasticization in the feeding part or the plasticizing part (hereinafter sometimes referred to as a "first aspect of the present invention").

[2] An injection-foaming method for a thermoplastic resin which comprises using a molding machine provided with an injection unit having a feeding part and a plasticizing part wherein a thermoplastic resin fed from the feeding part is plasticized and the resultant resin is injected as a foaming-agent-containing melted resin containing a foaming agent and a mold being provided with a mold cavity capable of expanding and contracting and being filled with the foaming-agent-containing melted resin injected from the injection unit, filling the mold cavity with a foaming-agent-containing melted resin by injecting it from the injection unit, and then enlarging the mold cavity for allowing the foaming-agent-containing melted resin to expand, the method is characterized in that an inclusion of a foaming agent into a thermoplastic resin is carried out by using a foam nucleating agent and a foaming gas as a foaming agent, the foam nucleating agent of the foaming agent is fed together with the thermoplastic resin before the plasticization to the feeding part of the injection unit, the foaming gas of the foaming agent is fed to the feeding part or the plasticizing part of the injection unit at a pressure of 0.1 MPa or more and less than 1.0 MPa, and the foaming gas is brought into contact with the thermoplastic resin before or after the plasticization and into contact with the foam nucleating agent in the feeding part or the plasticizing part (hereinafter sometimes referred to as a "second aspect of the present invention").

[3] The injection-foaming method for a thermoplastic resin according to the above-mentioned [1] or [2], wherein the feeding pressure of the mixture or the foaming gas to the feeding part or the plasticizing part of the injection unit is in the range of from 0.5 to 0.9 MPa.

[4] The injection-foaming method for a thermoplastic resin according to any one of the above-mentioned [1] to [3], wherein the feeding of the mixture or the foaming gas to the feeding part or the plasticizing part of the injection unit is done under controlled feeding pressure.

[5] The injection-foaming method for a thermoplastic resin according to any one of the above-mentioned [1] to [4], wherein the foaming gas is an inorganic gas selected from the group consisting of air, carbon dioxide, nitrogen, and a gas mixture of carbon dioxide and nitrogen.

[6] The injection-foaming method for a thermoplastic resin according to any one of the above-mentioned [1], [3], [4], and [5], wherein the foam nucleating agent is a fine powder of at least one inorganic material selected from the group consisting of iron oxide, calcium silicate, zinc stearate, and magnesium stearate.

[7] The injection-foaming method for a thermoplastic resin according to any one of the above-mentioned [2], [3], [4], and [5], wherein the foam nucleating agent is a fine powder of at least one selected from the group consisting of an organic acid, aluminum silicate, fiberglass, and talc.

[8] The injection-foaming method for a thermoplastic resin according to any one of the above-mentioned [1] to [7], wherein the thermoplastic resin is a polypropylene (PP) or a polyethylene (PE).

[9] The injection-foaming method for a thermoplastic resin according to any one of the above-mentioned [2], [3], [4], and [5], wherein the thermoplastic resin is a polyacetal (POM) or a polyamide (PA).

[10] The injection-foaming method for a thermoplastic resin according to any one of the above-mentioned [1] to [9], wherein the mixture or the foaming gas is fed to the plasticizing part of the injection unit, and a screw disposed on the plasticizing part is a 2-stage screw.

[11] The injection-foaming method for a thermoplastic resin according to the above-mentioned [2], wherein a foamed product having a foaming magnification of 1.1 to 3.0 and to be used for an automobile interior is obtained by using an automobile-interior-grade polypropylene (PP, melt flow index 10 to 70/ISO-1133) as the thermoplastic resin, mixing the thermoplastic resin with 0.1 to 10 mass % of an organic acid as the foam nucleating agent, and feeding carbon dioxide as the foaming gas to the plasticizing part at a pressure in the range of from 0.5 to 0.9 MPa.

According to the present invention, there is provided an injection-foaming method for a thermoplastic resin which can simply, safely, and efficiently produce a foamed product having a predetermined cell diameter and density. Furthermore, an injection-foaming method for a thermoplastic resin giving a less stress on environment is provided.

REFERENCE NUMERALS

Figure 1:
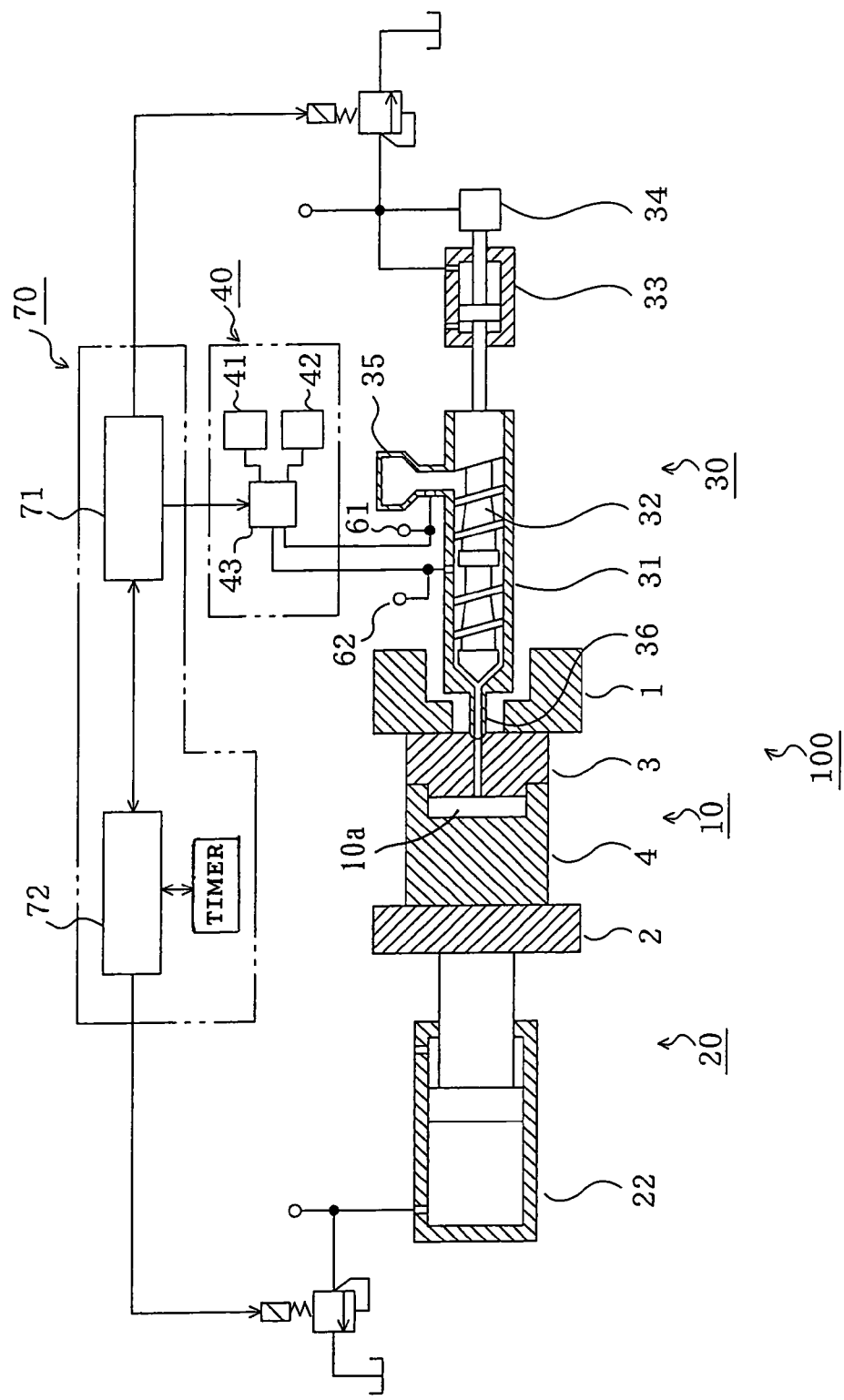
FIG. 1 is an explanatory diagram schematically showing the entire structure of an embodiment of a horizontally clamping type injection molding machine used in an injection-foaming method for a thermoplastic resin according to an embodiment of the present invention.

1: fixed platen
2: movable platen
3: fixed mold
4: movable mold
10: mold
10a: mold cavity
20: clamping unit
30: injection unit
31: plasticizing cylinder
32: screw
35: hopper
40: foaming-gas-feeding means
41: air supply source
42: carbon-dioxide supply source
43: foaming gas feeder
61: foam nucleating agent feeder
62: foam nucleating agent feeder
70: controlling unit
100: horizontally clamping type injection molding machine

BEST MODE FOR CARRYING OUT THE INVENTION

The best mode for carrying out the present invention will now be specifically described with reference to the drawings.

As shown in FIG. 1, an injection-foaming method for a thermoplastic resin of the present invention (a first embodiment) which comprises using an injection unit 30 having a feeding part (shown as the hopper 35 in FIG. 1) and a plasticizing part (shown as the plasticizing cylinder 31 and the screw 32 in FIG. 1) wherein a thermoplastic resin fed from the feeding part (hopper) 35 is plasticized at the plasticizing part (plasticizing cylinder and screw) 31, 32 and the resultant resin is injected as a foaming-agent-containing melted resin containing a foaming agent and a mold being provided with a mold-cavity 10a capable of expanding and contracting and being filled with the foaming-agent-containing melted resin injected from the injection unit 30, filling the mold cavity 10a with a foaming-agent-containing melted resin by injecting it from the injection unit 30, and then enlarging the mold cavity 10a for allowing the foaming-agent-containing melted resin to expand, the method is characterized in that an inclusion of a foaming agent into a thermoplastic resin is carried out by using a mixture of a foam nucleating agent and a foaming gas as a foaming agent, the mixture is fed to a feeding part (hopper) 35 or a plasticizing part (plasticizing cylinder and screw) 31, 32 of an injection unit 30 at a pressure of 0.1 MPa or more and less than 1.0 MPa, and the mixture is brought into contact with a thermoplastic resin before or after the plasticization in the feeding part (hopper) 35 or the plasticizing part (plasticizing cylinder and the screw) 31, 32.

As shown in FIG. 1, an injection-foaming method for a thermoplastic resin of the present invention (a second embodiment) which comprises using an injection unit 30 having a feeding part (shown as the hopper 35 in FIG. 1) and a plasticizing part (shown as the plasticizing cylinder 31 and the screw 32 in FIG. 1) wherein a thermoplastic resin fed from the feeding part (hopper) 35 is plasticized at the plasticizing part (plasticizing cylinder and screw) 31, 32 and the resultant resin is injected as a foaming-agent-containing melted resin containing a foaming agent and a mold 10 being provided with a mold cavity 10a capable of expanding and contracting and being filled with the foaming-agent-containing melted resin injected from the injection unit, filling the mold cavity 10a with a foaming-agent-containing melted resin by injecting it from the injection unit 30, and then enlarging the mold cavity 10a for allowing the foaming-agent-containing melted resin to expand, the method is characterized in that an inclusion of a foaming agent into a thermoplastic resin is carried out by using a foam nucleating agent and a foaming gas as a foaming agent, the foam nucleating agent of the foaming agent is fed together with the thermoplastic resin before the plasticization to the feeding part (hopper) 35 of the injection unit, the foaming gas of the foaming agent is fed to the feeding part (hopper) 35 or the plasticizing part (plasticizing cylinder and screw) 31, 32 of the injection unit 30 at a pressure of 0.1 MPa or more and less than 1.0 MPa, and the foaming gas was brought into contact with the thermoplastic resin before or after the plasticization and into contact with the foam nucleating agent in the feeding part or the plasticizing part. The entire structure of the horizontally clamping type injection molding machine 100 shown in FIG. 1 is described below.

In the first embodiment of the present invention, a mixture of a foam nucleating agent and a foaming gas is used as the foaming agent. This mixture is fed to the feeding part (hopper) 35 or the plasticizing part (plasticizing cylinder and screw) 31 and 32 of the injection unit 30, usually, at a pressure of 0.1 MPa or more and less than 1.0 MPa, preferably, at a pressure in the range of from 0.5 to 0.9 MPa. When the feeding pressure of the mixture (foaming gas) is less than 0.1 MPa, a predetermined cell density and cell diameter cannot be obtained. When the feeding pressure is 1.0 MPa or more, defective appearance caused by swirl mark in the molded product becomes significant. In addition, since the feeding pressure of the mixture (foaming gas) is adjusted to a pressure of 0.1 MPa or more and less than 1.0 MPa, the use of a supercritical-fluid generator and feeder is unnecessary unlike a known method using a foaming gas in the supercritical state.

In the second embodiment of the present invention, a foam nucleating agent and a foaming gas are used as the foaming agent. The foam nucleating agent is fed to the feeding part (hopper) 35 of the injection unit 30 together with a thermoplastic resin before the plasticization. The foaming gas of the foaming agent is fed to the feeding part (hopper) 35 or the plasticizing part (plasticizing cylinder and screw) 31 and 32 of the injection unit 30 usually at a pressure of 0.1 MPa or more and less than 1.0 MPa, preferably, at a pressure in the range of from 0.5 to 0.9 MPa. The grounds for adjusting the feeding pressure of the foaming gas to the above-mentioned range are the same as those in the first embodiment.

In the present invention (the first and second embodiments), it is preferable that the feeding of the mixture or the foaming gas to the feeding part (hopper) 35 or the plasticizing part (plasticizing cylinder and screw) 31 and 32 of the injection unit 30 be done under controlled feeding pressure (by a controlling unit 70 shown in FIG. 1). The controlling unit 70 will be described below.

In the present invention (the first and second embodiments), the foaming gas is preferably an inorganic gas such as air, carbon dioxide, nitrogen, or a gas mixture of carbon dioxide and nitrogen. With such a constitution, a foam injection molded product of a thermoplastic resin having a predetermined cell diameter and density and not containing harmful residual decomposition products can simply, safely, and efficiently be produced without using a foaming agent harmful to the environment (heavy burden on the environment) and without using a supercritical-fluid generator and feeder which are complicated in the installation and handling and are under legal regulation.

In the present invention (the first and second embodiments), the foam nucleating agent is preferably a fine powder of at least one inorganic material selected from the group consisting of iron oxide, calcium silicate, zinc stearate, and magnesium stearate.

In the present invention (the first and second embodiments), the foam nucleating agent may be a fine powder of at least one selected from the group consisting of an organic acid such as citric acid and tartaric acid, aluminum silicate, fiberglass, and talc.

In the present invention (the first and second embodiments), the thermoplastic resin is preferably an olefin-based resin such as a polypropylene (PP) or a polyethylene (PE). In particular, the olefin-based resin such as a polypropylene (PP) and a polyethylene (PE) is unnecessary to be dried as the molding material and thereby is suitably used when the foam nucleating agent is a fine powder of at least one inorganic material selected from the group consisting of iron oxide, calcium silicate, zinc stearate, and magnesium stearate, and the foaming gas is an inorganic gas such as air, carbon dioxide, nitrogen, or a gas mixture of carbon dioxide and nitrogen.

When the foam nucleating agent is a fine powder of at least one selected from the group consisting of an organic acid such as citric acid and tartaric acid, aluminum silicate, fiberglass, and talc, and the foaming gas is an inorganic gas such as air, carbon dioxide, nitrogen, or a gas mixture of carbon dioxide and nitrogen, the thermoplastic resin may be a crystalline or amorphous resin such as a polyacetal (POM) and a polyamide (PA), in addition to the olefin-based resin such as a polypropylene (PP) and a polyethylene (PE).

In the present invention (the first and second embodiments), the mixture or the foaming gas is fed to the feeding part (hopper) 35 or the plasticizing part (plasticizing cylinder and screw) 31 and 32 (for example, in a foaming-agent-containing melted resin) of the injection unit 30. Therefore, the foaming gas and the foam nucleating agent can sufficiently be dispersed and mixed in the foaming-agent-containing melted resin. When the mixture or the foaming gas is fed to the plasticizing part (plasticizing cylinder and screw) 31 and 32 of the injection unit 30, it is preferable that the screw provided to the plasticizing part (plasticizing cylinder and screw) 31 and 32 be a 2-stage screw for further certainly dispersing and mixing the foaming gas and the foam nucleating agent in the foaming-agent-containing melted resin. Additionally, the screw 32 is preferably provided with a high-dispersion screw-head from the viewpoint of improving the dispersion and mixing of the foaming-agent-containing melted resin with the foaming gas and the foam nucleating agent.

In the second embodiment of the present invention, a foamed product having a foaming magnification of 1.1 to 3.0 for an automobile interior can simply, safely, and efficiently be obtained by using an automobile-interior-grade polypropylene (PP, melt flow index 10 to 70/ISO-1133) as the thermoplastic resin, mixing the thermoplastic resin with 0.1 to 10 mass % of an organic acid such as citric acid or tartaric acid as the foam nucleating agent, and feeding carbon dioxide as the foaming gas at a pressure in the range from 0.5 to 0.9 MPa to the plasticizing part (plasticizing cylinder and screw) 31 and 32.

An embodiment of a horizontally clamping type injection molding machine used in the present invention shown in FIG. 1 will now specifically be described. The horizontally clamping type injection molding machine 100 used in the present invention is composed of a mold 10, a clamping unit 20, an injection unit 30, a foaming gas feeding means 40, and a controlling unit 70.

The mold 10 is composed of a fixed mold 3 mounted on a fixed platen 1 and a movable mold 4 mounted on a movable platen 2. The fixed mold 3 and the movable mold 4 are in a semi-pressing structure for engaging with each other at an engaging part, and are constituted so as to form a mold cavity 10a by the combination of a cavity face provided to the fixed mold 3 and a cavity face provided to the movable mold 4. The engaging part of the semi-pressing structure is provided along the entire circumference of the mold cavity 10a for preventing a resin filled into the mold cavity 10a from leaking out of the mold 10 even when the capacity of the mold cavity 10a is enlarged after the injection.

The clamping unit 20 is provided with a clamping cylinder 22 for controlling the opening and closing the mold 10 and is constituted so that the movable mold 4 is guided to a tie bar (not shown) and thereby can move toward and away from the fixed mold 3. Thus, the capacity of the mold cavity 10a is changeable.

In the embodiment of the present invention, the mold 10 has a semi-pressing structure, thereby preventing the resin in the mold cavity 10a from leaking even when the mold 10 is opened by a predetermined stroke. However, the mold is not limited to this. For example, a flash-type mold may be used as long as the mold can be applied to foam molding. In addition, in this embodiment, the injection molding machine is a horizontally clamping type having a direct-pressure clamping device. The injection molding machine may use a toggle clamping device or an electric servomotor, and may be a vertically clamping type.

The injection unit 30 is provided with a plasticizing cylinder 31, a screw 32 mounted on the inside of the plasticizing cylinder 31 and having a flight, and a hopper 35 for feeding a molding material into the plasticizing cylinder 31. The injection unit 30 is further provided with a screw-moving means 33 for moving the screw 32 forward and backward and a screw-rotating means 34 for rotating the screw 32, and thereby a foaming gas is fed into a foaming-agent-containing melted resin in the feeding part (hopper) 35 or the plasticizing part (plasticizing cylinder and screw) 31 and 32 from the foaming gas feeding means 40. Furthermore, a heater (not shown) is mounted on the circumference of the plasticizing cylinder 31.

The injection unit 30 is constituted for feeding a pellet-shaped molding material to the plasticizing cylinder 31 from the hopper 35 by rotating the screw 32 driven by the screw-rotating means 34. The fed pellet-shaped molding material is heated by the heater mounted on the plasticizing cylinder 31 and is kneaded and compressed by the rotation of the screw 32, and thereby the molding material is melted while the foaming gas and the foam nucleating agent are dispersed and mixed in the molding material, which is transferred to the front of the screw 32. Thus, the kneaded foaming-agent-containing melted resin where the foaming gas and the foam nucleating agent are dispersed is fed to the front of the screw 32 and is injected into the mold from a nozzle 36 provided to the end of the plasticizing cylinder 31 by the force of the screw 32 moving forward by the screw-moving means 33. When the foam nucleating agent is a fine powder of at least one inorganic material selected from the group consisting of iron oxide, calcium silicate, zinc stearate, and magnesium stearate, a suitable amount of the foam nucleating agent can be fed from foam nucleating agent-feeding devices 61 and 62, which will be described below, according to predetermined molding conditions.

In the injection unit 30 according to the embodiment, the screw-moving means 33 is a hydraulic cylinder, and the screw-rotating means 34 is a hydraulic motor. However, the present invention is not limited to these. A screw-moving means and a screw-rotating means which use an electric servomotor may be used. In addition, in this embodiment, the injection unit is an in-line screw type in which the plasticization and the injection are done by using a single screw. However, a pre-plasticization-type injection unit may be used for conducting the plasticization and the injection by the individual mechanisms. Furthermore, in this embodiment, the shape of the screw 32 is a 2-stage screw, but may be a single-stage screw when the foaming gas is fed to the hopper 35, for example.

The foaming gas feeding means 40 is provided with an air supply source 41, a carbon dioxide supply source 42, and a foaming gas feeder 43. The air supply source 41 and the carbon dioxide supply source 42 are connected to each other via a feeding channel. Furthermore, the foaming gas feeding means 40 is provided with a foaming-gas feeding channels connected to gas-feed openings provided to the plasticizing cylinder 31 and the hopper 35 of the injection unit 30, and thereby feeds a foaming gas to the injection unit 30 according to indication from the controlling unit 70. In addition, the foam nucleating agent-feeding devices 61 and 62 for feeding a foam nucleating agent are provided near the end of the feeding channels connected to the foaming gas feeder 43 and the injection unit 30, and thereby, for example, a fine powder of at least one inorganic material selected from the group consisting of iron oxide, calcium silicate, zinc stearate, and magnesium stearate is fed into a foaming gas.

Figure 2:
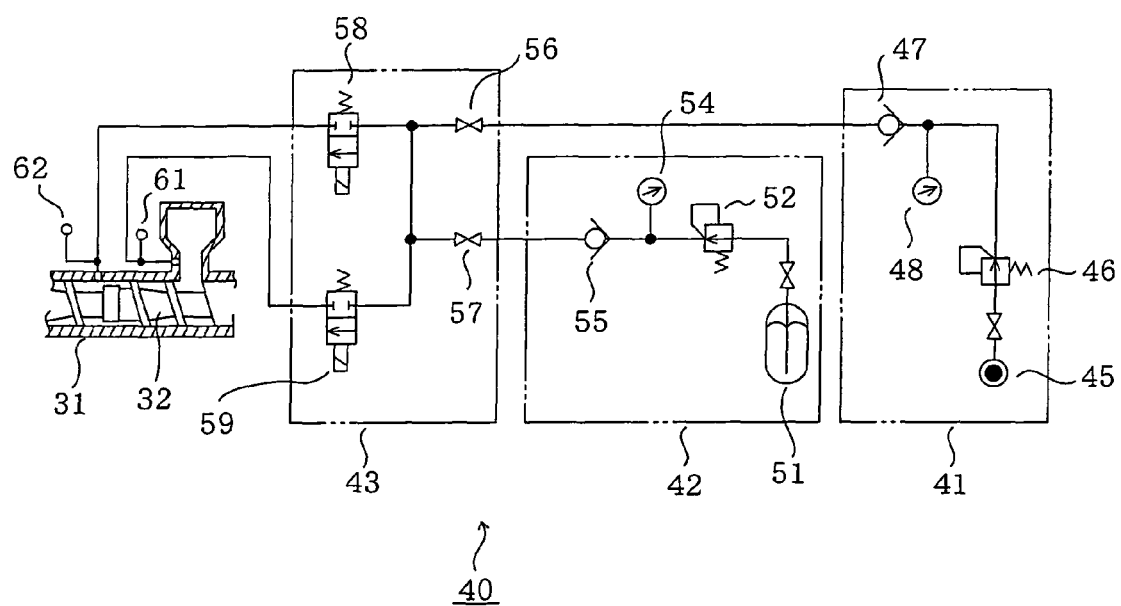
FIG. 2 is an explanatory diagram schematically showing a fundamental structure of an example of a foaming-gas-feeding means used in an injection-foaming method for a thermoplastic resin according to an embodiment of the present invention.

With reference to FIG. 2, the foaming gas feeding means 40 is composed of an air supply source 41, a carbon dioxide supply source 42, and a foaming gas feeder 43. Reference numeral 31 represents a plasticizing cylinder, reference numeral 32 represents a screw, and reference numerals 61 and 62 represent foam nucleating agent-feeding devices for feeding a foam nucleating agent into a foaming gas (these reference numerals are the same as those of FIG. 1). The air supply source 41 is provided with an air compressor 45, a pressure-regulating valve 46, a check valve 47, and a pressure gauge 48. The carbon dioxide supply source 42 is provided with a carbon dioxide cylinder 51, a pressure-regulating valve 52, a pressure gauge 54, and a check valve 55. The foaming gas feeder 43 is provided with on-off valves 56 and 57 and electromagnetic changeover valves 58 and 59.

The air supply source 41 has a constitution for depressurizing air compressed by the air compressor 45 by using the pressure-regulating valve 46 and feeding the air to the foaming gas feeder 43 via the check valve 47. The air fed to the foaming gas feeder 43 can be transferred into the injection unit 30 from the plasticizing cylinder 31 and/or the hopper 35 via the on-off valve 56 and the electromagnetic changeover valves 58 and 59. The pressure of the air is decreased to a predetermined level by the pressure-regulating valve 46 and then is fed to the foaming gas feeder 43 via the check valve 47 by opening the on-off valve 56. The air fed to the foaming gas feeder 43 can be transferred to a foaming-agent-containing melted resin from a gas-feed opening disposed in approximately the center of the plasticizing cylinder 31 and from a gas-feed opening disposed on the hopper 35 by opening the electromagnetic changeover valves 58 and 59, respectively. In the embodiment of the present invention, the air compressor 45 is used as the air source, but the pressure of plant air is decreased to a predetermined level and the plant air may be supplied directly to the foaming gas feeder 43 when plant air can be used as an air source.

On the other hand, the carbon dioxide supply source 42 has a constitution for depressurizing carbon dioxide in the carbon dioxide cylinder 51 by the pressure-regulating valve 52 and feeding the carbon dioxide to the foaming gas feeder 43 via the check valve 55. The carbon dioxide fed to the foaming gas feeder 43 can be transferred into the injection unit 30 from the plasticizing cylinder 31 and the hopper opening via the on-off valve 57 and the electromagnetic changeover valves 58 and 59. The pressure of the carbon dioxide is decreased to a predetermined level by the pressure-regulating valve 52 and then is fed to the foaming gas feeder 43 via the check valve 55 by opening the on-off valve 57. The carbon dioxide fed to the foaming gas feeder 43 can be transferred to a melted resin from the gas-feed opening disposed in approximately the center of the plasticizing cylinder 31 and from the gas-feed opening disposed on the hopper 35 by opening the electromagnetic changeover valves 58 and 59, respectively.

When the foaming gas is nitrogen, a nitrogen supply source has the same constitution as that of the carbon dioxide supply source 42 in FIG. 2, and the nitrogen cylinder is replaced with the carbon dioxide cylinder 51 as the nitrogen source. Alternatively, nitrogen in air is fed to the air compressor 45 by separating nitrogen from air by, for example, the air supply source 41 provided with a nitrogen gas separator having a gas-permeable film, without using the nitrogen supply source.

The controlling unit 70 is, as shown in FIG. 1, composed of an injection-controlling part 71 for controlling plasticization of a molding material, feeding of a foaming gas and a fine powder of at least one inorganic material selected from the group consisting of iron oxide, calcium silicate, zinc stearate, and magnesium stearate, and injection of a foaming-agent-containing melted resin to the mold 10; a clamp-controlling part 72 for controlling opening and closing of the mold 10 and controlling clamping force; a timer; and the like. The fine powder is. The clamp-controlling part 72 is provided with a position/speed-setting part for changing the position of the movable platen 2 so that the mold cavity 10a has a predetermined capacity at the starting of the resin-foaming process. In addition, the clamp-controlling part 72 can maintain the position of the movable platen 2 until the completion of the foaming process. The foaming process includes the steps of detecting the completion of filling the mold cavity 10a with a resin, decreasing the clamping force, and enlarging the mold cavity 10a. A surface skin and bubble cores are formed by decreasing the clamping force. The higher the clamping-force-reducing rate is, the larger the number of the bubble cores is. In addition, the enlargement rate of the mold cavity 10a is determined depending on the elongation viscosity of a molding resin. A low enlargement rate is preferable when the elongation viscosity is low, and a high enlargement rate is preferable when the elongation viscosity is high.

In this embodiment, when the foam nucleating agent is an organic acid such as citric acid or tartaric acid, aluminum silicate, fiberglass, or talc and a mixture of the foam nucleating agent with a molding material is fed to the injection molding machine, the foam nucleating agent may be formed into a powder and be dry blended with the molding material, or the foam nucleating agent may be formed into a masterbatch and be added to the molding material.

The process flow for injection molding will now be specifically described with reference to the above-mentioned horizontally clamping type injection molding machine 100. With reference to FIG. 1, a piston rod is moved forward by supplying pressure oil to the piston head side of the clamping cylinder 22 and thereby the movable platen 2 is moved toward the direction of the fixed platen 1. Thus, the mold 10 is clamped and maintained in the clamped state. The clamping force applied to the mold is preferably as low as possible in the range that the mold 10 is not opened by the filling pressure of a resin when the resin is injected from the viewpoints of energy to be used and life time of the molding machine. After the completion of the clamping, the mold cavity 10a is filled with a resin injected according to a predetermined injection amount, injection pressure, and injection rate.

The molding material fed from the hopper 35 by rotating the screw 32 driven by supplying pressure oil to the screw-rotating means 34 is heated by a heater mounted to the plasticizing cylinder 31 and is kneaded and compressed by the rotation of the screw 32 to melt the molding material while dispersing and mixing a foaming gas and a foam nucleating agent, and the material is transferred to the front of the screw 32. The foaming-agent-containing melted resin containing the foaming gas and the foam nucleating agent therein and fed to the front of the screw 32 can be injected into the mold cavity 10a by moving the screw 32 forward by supplying pressure oil to the screw-moving means 33. After the completion of the filling with resin, the clamping force is reduced by decreasing the pressure oil applied to the piston head side of the clamping cylinder 22. Then, the piston rod is moved backward by supplying pressure oil to the piston rod side of the clamping cylinder 22 and thereby the movable platen 2 is moved toward the opposite direction of the fixed platen. Thus, the mold opening of the mold 10 is done to enlarge the capacity of the mold cavity 10a. The enlargement of capacity of the mold cavity 10a is controlled according to a predetermined value of the position/speed-setting part for changing the position of the movable platen 2 provided to the clamp-controlling part 72. The movable platen 2 stops at a predetermined position, and the movable platen 2 is maintained at the position not to move by the resin-foaming pressure in the mold. Thus, the enlargement of capacity of the mold is controlled so that the capacity of the mold cavity 10a is increased, and thereby the resin pressure in the mold cavity 10a starts to decrease, and, simultaneously, the foaming starts in the resin. After a cooling process of a molded product for a predetermined cooling time while maintaining the capacity of the mold cavity 10a, the mold 10 is moved backward to the position where the molded product is drawn from the mold, and, thus, the foamed product can be obtained. In this embodiment, the fixed mold 3 and the movable mold 4 are engaged with each other at the engaging part. Therefore, the foaming-agent-containing resin in the mold cavity 10a is not leaked to the outside of the mold 10 even if the mold 10 is slightly opened.

EXAMPLES

The present invention will now further specifically be described with reference to EXAMPLES.

Example 1

A horizontal toggle type injection molding machine (DP350 injection molding machine made by Ube Machinery Corporation, Ltd.) was used as an injection molding machine, and a polypropylene (automobile-interior-grade MRF30/IS01133 manufactured by Mitsui Chemical Inc.) was used as a thermoplastic resin. A fine powder of iron oxide and air were used as a foam nucleating agent and a foaming gas, respectively, and were injected into a foaming-agent-containing melted resin in a plasticizing cylinder at a pressure of 0.6 MPa. The plasticizing screw was a 2-stage screw having a mixing head at the end thereof. A molded article was an automobile interior product (glove box outer) having a size of 350×220 mm. The thickness of a mold cavity when filling with the resin was 1.8 mm, the thickness after the enlargement of the mold cavity was 3.6 mm (capacity enlargement ratio: 2 times). The molding conditions were set to a resin temperature of 200° and a mold temperature of 30°. The molded product was evaluated by a visual inspection of foam cell density and appearance. The foam state of cell layer of the product prepared in EXAMPLE 1 was a cluster of fine foam cells having a predetermined cell density and cell diameter. In addition, the appearance state was good with slight swirl marks and silver streaks. Since the foam nucleating agent was a fine powder of iron oxide, and the foaming gas was air, there was no generation of harmful decomposition products during the molding. Therefore, the resulting foamed product of a thermoplastic resin did not contain harmful residual decomposition products.

Example 2

A fine powder of citric acid was used as the foam nucleating agent, and carbon dioxide was used as the foaming gas (the molding machine, molding material, molded article, screw, and the molding conditions were the same as those in EXAMPLE 1). A molding material prepared by mixing the fine powder of citric acid (2.5 mass %) to a polypropylene (automobile-interior-grade MRF30/ISO1133 manufactured by Mitsui Chemical Inc.) was fed to a hopper of the molding machine. Carbon dioxide was injected into a melted resin in the plasticizing cylinder at a pressure of 0.6 MPa. The foam state of cell layer of the product prepared in EXAMPLE 2 was a cluster of fine foam cells having a predetermined cell density and cell diameter. In addition, the appearance state was good with slight swirl marks and silver streaks. Since the foam nucleating agent was a fine powder of citric acid, and the foaming gas was carbon dioxide, there was no generation of harmful decomposition products during the molding. Therefore, the resulting foamed product of a thermoplastic resin did not contain harmful residual decomposition products.

Comparative Example 1

Carbon dioxide at a high pressure was used as the foaming gas (the molding machine, molding material, molded article, screw, and the molding conditions were the same as those in EXAMPLE 1). A polypropylene (automobile-interior-grade MRF30/ISO1133 manufactured by Mitsui Chemical Inc.) was fed to the hopper of the molding machine. Carbon dioxide pressurized with the booster was injected into a melted resin in the plasticizing cylinder at a pressure of 10 MPa. The cell layer of the product prepared in COMPARATIVE EXAMPLE 1 was in the state that large cells were mixed. In addition, the appearance state was that swirl marks and silver streaks were significant. Thus, a foam injection molded product including a cluster of fine foam cells having a predetermined cell density and cell diameter could not be obtained.

INDUSTRIAL APPLICABILITY

According to the injection-foaming method for a thermoplastic resin of the present invention, a foam injection molded product of a thermoplastic resin having a predetermined cell density and cell diameter and not containing harmful residual decomposition products can simply, safely, and efficiently be produced without using a foaming agent which is harmful to the environment and is a heavy burden on the environment and without using a supercritical-fluid generator and feeder which are complicated in the installation and handling and are under legal regulation. In addition, a foam injection molded product including a cluster of fine foam cells having a predetermined cell density and cell diameter and having an excellent appearance can simply, safely, and efficiently be produced. Therefore, the injection-foaming method for a thermoplastic resin of the present invention can suitably be applied to various industrial fields which require a foam injection molded product of a thermoplastic resin superior in terms of properties such as lightness in weight, heat insulation, sound absorption, and rigidity at the same mass.

The invention claimed is:

1. An injection-foaming method for a thermoplastic resin which comprises:

providing a molding machine provided with two stage screw injection unit having a resin feeding part and a resin plasticizing part which can increase a foaming agent pressure at the fore-end of the two stage screw wherein a thermoplastic resin fed from the feeding part is plasticized at the plasticizing part, a plasticizing cylinder and a screw, under increasing pressure and the resultant resin is injected as a foaming-agent-containing melted resin containing the foaming agent and the molding machine also having a mold being provided with a mold cavity capable of expanding and contracting and being filled with the foaming-agent-containing melted resin injected from the injection unit and a clamp-controlling part capable of maintaining a position of the mold until a completion of a foaming process, injecting the foaming agent into a thermoplastic resin by using a mixture of a foam nucleating agent and a foaming gas, consisting of compressed nitrogen gas or compressed air, as a foaming agent, feeding the mixture to a feeding part or a plasticizing part of an injection unit at a pressure of 0.1 MPa or more and less than 1.0 MPa, contacting the mixture with a thermoplastic resin before or after the plasticization in the feeding part or the plasticizing part and increasing the pressure of the foaming agent at the fore end of the two stage screw; and filling the mold cavity with a foaming-agent-containing melted resin by injecting it from the injection unit, detecting a completion of filling the mold cavity with the resin, decreasing a clamping force of the mold cavity, and then enlarging the mold cavity for allowing the foaming-agent-containing melted resin to expand.

2. An injection-foaming method for a thermoplastic resin which comprises:

providing a molding machine provided with a two stage screw injection unit having a resin feeding part and a resin plasticizing part which can increase a foaming agent pressure at the fore-end of the two stage screw wherein a thermoplastic resin fed from the feeding part is plasticized at the plasticizing part, a plasticizing cylinder and a screw, under increasing pressure and the resultant resin is injected as a foaming-agent-containing melted resin containing the foaming agent and the molding machine also having a mold being provided with a mold cavity capable of expanding and contracting and being filled with the foaming-agent-containing melted resin injected from the injection unit and a clamp-controlling part capable of maintaining a position of the mold until a completion of a foaming process, injecting the foaming agent into a thermoplastic resin by using a foam nucleating agent and a foaming gas, consisting of compressed nitrogen gas or compressed air, as a foaming agent, feeding the foam nucleating agent of the foaming agent together with the thermoplastic resin before the plasticization to the feeding part of the injection unit, the foaming gas of the foaming agent is fed to the feeding part or the plasticizing part of the injection unit at a pressure of 0.1 MPa or more and less than 1.0 MPa, contacting the foaming gas with the thermoplastic resin before or after the plasticization and with the foam nucleating agent in the feeding part or the plasticizing part and increasing the pressure of the foaming agent at the fore end of the two stage screw; and filling the mold cavity with a foaming-agent-containing melted resin by injecting it from the injection unit, detecting a completion of filling the mold cavity with the resin, decreasing a clamping force of the mold cavity, and then enlarging the mold cavity for allowing the foaming-agent-containing melted resin to expand.

3. The injection-foaming method for a thermoplastic resin according to claim 1, wherein the feeding pressure of the mixture or the foaming gas to the feeding part or the plasticizing part of the injection unit is in the range of from 0.5 to 0.9 MPa.

4. The injection-foaming method for a thermoplastic resin according to claim 1, wherein the feeding of the mixture or the foaming gas to the feeding part or the plasticizing part of the injection unit is done under controlled feeding pressure.

5. The injection-foaming method for a thermoplastic resin according to claim 1, wherein the foam nucleating agent is a fine powder of at least one inorganic material selected from the group consisting of iron oxide, calcium silicate, zinc stearate, and magnesium stearate.

6. The injection-foaming method for a thermoplastic resin according to claim 2, wherein the foam nucleating agent is a fine powder of at least one selected from the group consisting of an organic acid, aluminum silicate, fiberglass, and talc.

7. The injection-foaming method for a thermoplastic resin according to claim 1, wherein the thermoplastic resin is a polypropylene (PP) or a polyethylene (PE).

8. The injection-foaming method for a thermoplastic resin according to claim 2, wherein the thermoplastic resin is a polyacetal (POM) or a polyamide (PA).

9. The injection-foaming method for a thermoplastic resin according to claim 1, wherein the mixture or the foaming gas is fed to the plasticizing part of the injection unit.

10. The injection-foaming method for a thermoplastic resin according to claim 2, wherein a foamed product having a foaming magnification of 1.1 to 3.0 and to be used for an automobile interior is obtained by using an automobile-interior-grade polypropylene (PP, melt flow index 10 to 70/ISO-1133) as the thermoplastic resin, mixing the thermoplastic resin with 0.1 to 10 mass% of an organic acid as the foam nucleating agent, and feeding carbon dioxide as the foaming gas to the plasticizing part at a pressure in the range of from 0.5 to 0.9 MPa.

* * * * *